(12) United States Patent
Chia et al.

(10) Patent No.: US 7,469,376 B2
(45) Date of Patent: Dec. 23, 2008

(54) SYSTEM AND METHOD FOR COMPILING DOCUMENTS AND TRACKING TECHNOLOGY CHANGES IN A SEMICONDUCTOR MANUFACTURING ENVIRONMENT USING A DOCUMENT GENERATION ENGINE

(75) Inventors: Yu-Tai Chia, San Jose, CA (US); Tse-Lun Tsai, Taipei County (TW); Chung-Lun Kuo, Taipei County (TW); Shiun-Huan Lai, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1097 days.

(21) Appl. No.: 10/804,540

(22) Filed: Mar. 19, 2004

(65) Prior Publication Data

US 2005/0206957 A1    Sep. 22, 2005

(51) Int. Cl.
*G06F 17/00* (2006.01)
(52) U.S. Cl. .................................... 715/209; 715/243
(58) Field of Classification Search ................. 715/255, 715/243, 209
See application file for complete search history.

(56) References Cited

U.S. PATENT DOCUMENTS

| | | | |
|---|---|---|---|
| 5,578,273 A | 11/1996 | Hanson et al. | |
| 5,623,655 A * | 4/1997 | Chisaka | 707/8 |
| 6,157,947 A | 12/2000 | Watanabe et al. | |
| 6,245,634 B1 | 6/2001 | Or-Bach | |
| 6,293,288 B2 | 9/2001 | Shindo et al. | |
| 6,530,065 B1 * | 3/2003 | McDonald et al. | 716/4 |
| 7,069,501 B2 * | 6/2006 | Kunitake et al. | 715/234 |
| 7,246,240 B2 * | 7/2007 | Chuang et al. | 713/176 |
| 7,263,477 B2 * | 8/2007 | Chen et al. | 703/13 |
| 2002/0177260 A1 * | 11/2002 | Matsumoto | 438/154 |
| 2005/0055636 A1 * | 3/2005 | Graves | 715/526 |

OTHER PUBLICATIONS

McLean, Charles, et al, "Simulation Standards: A Framework for Standard Modular Simulation", WSC '02: Proceedings of the 34th Conference on Winter Simulation: Exploring New Frontiers, Winter Simulation Conference, Dec. 2002, pp. 1613-1620.*

* cited by examiner

*Primary Examiner*—Laurie Ries
(74) *Attorney, Agent, or Firm*—Haynes and Boone, LLP

(57) ABSTRACT

A computer-based system and method for generating a primary document characterizing a device from multiple secondary documents is provided. In one example, the method includes defining a primary document template and multiple input files. Each input file defines the source and type of information for a section of the primary document template. A document generation engine parses the secondary documents and inserts information from them into the primary document template based on the input files. After the primary document is generated, related technologies or devices may be identified and notified of changes to the device in the primary document. The related technologies or devices may then be updated if desired.

22 Claims, 6 Drawing Sheets

SYSTEM AND METHOD FOR COMPILING DOCUMENTS AND TRACKING TECHNOLOGY CHANGES IN A SEMICONDUCTOR MANUFACTURING ENVIRONMENT USING A DOCUMENT GENERATION ENGINE

BACKGROUND

The present disclosure relates generally to a semiconductor fabrication system and, more particularly, to a computer-based system and method for generating documents using information from a plurality of manufacturing entities within the semiconductor fabrication system.

In a semiconductor manufacturing business, such as a semiconductor foundry business, information technology (IT) services provide cohesion and support both internally and externally. For example, IT services in a foundry business may provide operations to support a network of processing equipment, computing devices, robotics, customers, and manufacturing equipment. One operation performed by IT services is the tracking and management of documents containing information associated with customers, products, manufacturing devices, and other aspects of integrated circuit (IC) manufacturing. For example, the documents may contain information on product designs, fabrication processes, product specifications, operational procedures, and manufacturing information. However, such information is often stored and used in many different formats and even in different versions of one format. These formats may have incompatibilities that prevent the exchange of information between formats and may create confusion because of the existence of multiple versions. Such incompatibilities may result in a loss of productivity due to mistakes and similar issues.

Accordingly, what is needed is a system and method that addresses the above discussed issues.

DETAILED DESCRIPTION

Figure 1:
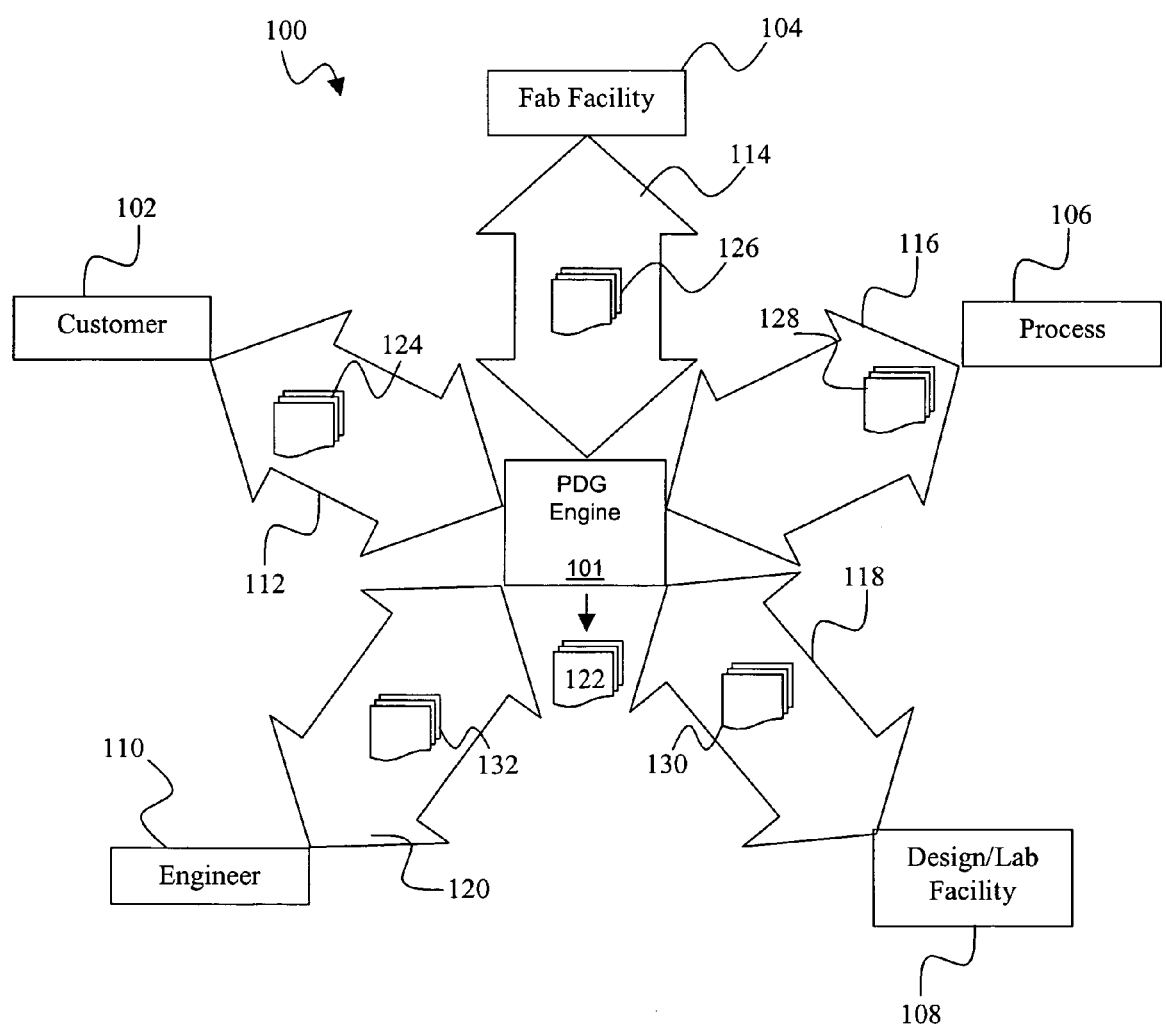
FIG. 1 illustrates an exemplary semiconductor manufacturing system that includes a primary document generation (PDG) engine.

A method and system are provided for compiling documents in a microelectronics product manufacturing environment using a document generation engine. It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, an exemplary semiconductor manufacturing system 100 includes a primary document generation (PDG) engine 101, a plurality of manufacturing entities 102, 104, 106, 108, and 110, a plurality of information pipelines 112, 114, 116, 118, and 120, and a plurality of primary documents 122. The PDG engine 101, the entities 102-110, and the pipelines 112-120 may be connected by one or more communication networks (not shown). As will be described in greater detail below, the primary documents 122 may be generated using information from the information pipelines 112-120, and may be available to each of the entities 102-110.

For purposes of example, the entities include a customer 102, a fabrication (fab) facility 104, a process 106, a design/laboratory facility 108, and one or more engineers 110. Each of the entities 102-110 may be included in one of the other entities, and each entity may include other entities such as manufacturing equipment, information technology personnel, process recipes, etc. Furthermore, each entity 102-110 may include information associated with the semiconductor manufacturing system 100. An exemplary manufacturing environment is described in greater detail with respect to FIG. 6.

The pipelines 112-120 may transfer information through wired and/or wireless communication channels. Such channels may be provided by centrally located or distributed equipment. The pipelines 112-120 include a plurality of information and secondary documents 124, 126, 128, 130, and 132, respectively. These secondary documents, which may include charts, figures, formulas, fabrication processes, device parameters, masks, reports, etc., represent information that may be created, maintained, and/or used by the respective entities 102-110. It is understood that, although the pipelines 112-120 are illustrated as being between the entities 102-110 and the primary documents 122, the pipelines may include one or more of the entities 102-110 and/or the primary documents 122. Furthermore, the primary and secondary documents 122-132 may be stored or maintained within one or more of the entities 102-110 and/or the pipelines 112-120.

As will be described later in greater detail, the PDG engine may retrieve information stored in the secondary documents 124-132 and use this information to generate the primary documents 122. It is understood that some steps of the generation process may be automatically performed by a computer, while other steps may be performed manually.

Figure 2:
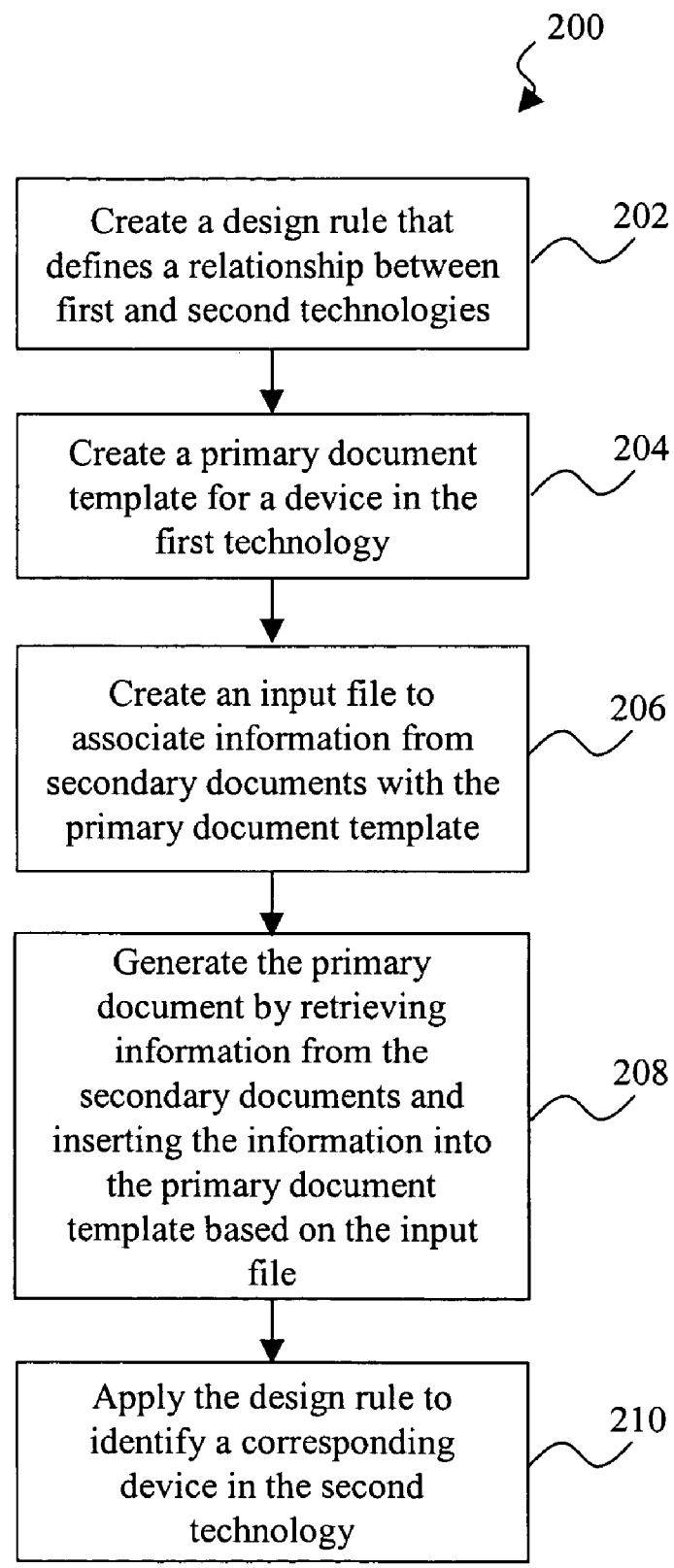
FIG. 2 is a flow chart of an exemplary method that may be executed within the system of FIG. 1 to generate a primary document from multiple secondary documents.

Referring now to FIG. 2, an exemplary method 200 provides one process for generating a primary document (e.g., the primary document 122 of FIG. 1). As will be described later in greater detail, the primary document may be generated from one or more of the secondary documents 124-132 (FIG. 1) using a primary document template and a plurality of input files. Once generated, the primary document may be used to identify and update devices and components in technologies related to that described in the primary document.

In step 202, a design rule may be created that defines one or more relationships between various technologies. The technologies may cover devices, processes, fabrication steps, etc., and any or all of these may be included when defining the relationships. The relationships may be identified using a device truth table or other means. In step 204, a primary document template may be created for a device in one of the technologies. The primary document template may include multiple sections and subsections that define how information will be organized and presented when the primary document is generated.

In step 206, an input file may be created that associates information from the secondary documents with the primary document template. The information may identify a device component, the device's behavior, or any other characteristic contained by or associated with the device. It is understood that the term "device" is used for purposes of convenience, and that the device may be, for example, a complete device, a component, or a process used to create a device.

In step 208, the primary document may be generated by retrieving information from the secondary documents and inserting the information into the primary document template based on the input file. The information may be retrieved from model cards, system files, user input, or any other source, and may be predefined or dynamically generated. For example, a program may be executed that produces simulation information that is then added to the primary document template.

In step 210, the previously defined design rule may be applied to identify a corresponding device in the second technology. For example, the design rule may be used to locate the device described in the primary document in the device truth table, and then to identify any related technologies. In some embodiments, the method 200 may send one or more notifications regarding the primary document to users of the related technologies, enabling the users to synchronize the related technologies with the primary document.

Figure 3:
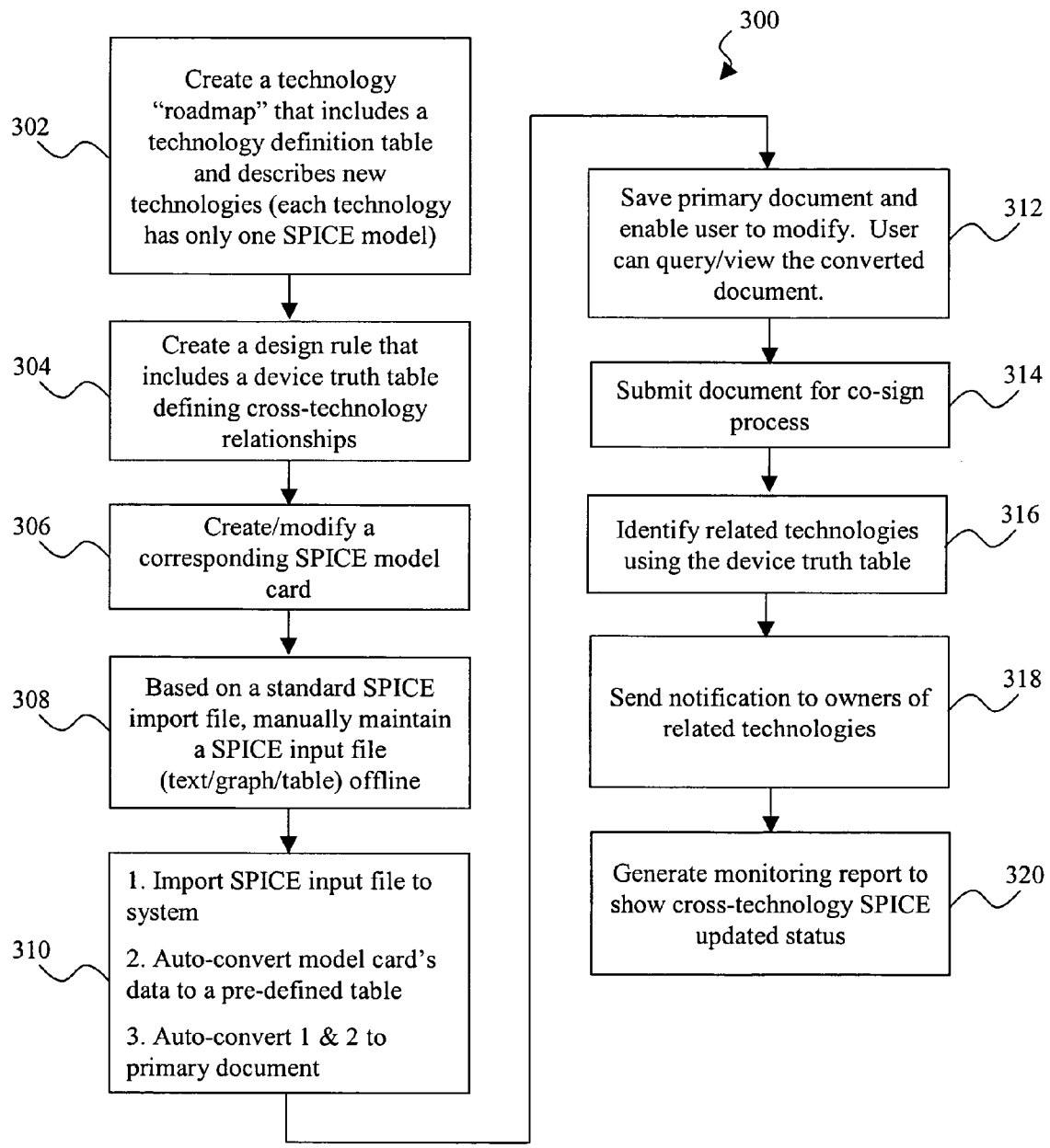
FIG. 3 is a flow chart of a more detailed example of the method of FIG. 2.

Referring now to FIG. 3, in another embodiment, a method 300 provides a more detailed example of the method 200 of FIG. 2. The present example is described in the context of a model for a device in a semiconductor environment, but it is understood that it may be applied to other models, devices, and environments. For example, the model may be a Simulation Program with Integrated Circuit Emphasis (SPICE) model designed for simulators such as Spectre™ (by Cadence Design Systems, Inc.), Star-HSPICE™ (by Synopsys, Inc.), and Eldo™ (by Mentor Graphics Corporation). For clarity, all such models will be referred to hereinafter as SPICE models. As is known, each model may associate multiple components and parameters with a device, and may be used to run simulations that predict device behavior under defined conditions.

The method 300 begins in step 302 with the creation of a technology "roadmap" that may include a technology definition table that defines current and/or new technologies, as well as what is contained within each technology. For example, the technology definition table may include devices, device parameters, design criteria for the devices, processes, fabrication and manufacturing requirements, etc., for each device. In addition, the technology definition table may contain one or more SPICE models (only one in the present example) for each device. In step 304, a design rule may be created that includes a device truth table. The device truth table defines one or more cross-technology relationships between the technologies defined in the technology definition table. The relationships may be based on devices, device components, identical or similar fabrication processes, etc. It is understood that the use of a truth table is for purposes of example, and that other formats or hierarchies may be used to organize and store the relationship information.

In step 306, the technology definition table and the design rule may be used to modify or create a SPICE model card for a particular device. The model card may be modified manually or may be modified automatically. In step 308, a SPICE input file (e.g., the input file 208 of FIG. 2) may be created or updated based on a standard SPICE import file (which may be in spreadsheet format). The input file may include or identify text, graphs, tables, etc., and may be maintained manually or automatically. The input file may also contain multiple fields that are defined by the user and that correspond to information in the SPICE model card and the SPICE import file.

As will be described later in greater detail with respect to FIG. 4, the primary document may be generated in step 310 using a multi-step process. For example, the SPICE input file may be imported into the system. Next, the model card's data may be converted into a pre-defined table format. The imported file and the converted data may then be used to create the primary document.

In step 312, the primary document may be saved, enabling a user to view and modify the document. In step 314, if the primary document is finished (e.g., if the user is satisfied that the primary document is ready for system-wide use), the user may submit the primary document for a co-sign process, where the primary document may be reviewed and approved by others. In step 316, technologies related to the device described in the primary document may be identified using relationships defined in the device truth table. In step 318, notifications may be sent to the "owners" of (e.g., those responsible for) the related technologies to inform them of changes that have occurred. For example, if a device component in the SPICE model on which the primary document is based was altered, then the device truth table may be used to identify technologies (and/or specific devices) that have the same component. In the present embodiment, this may be accomplished by locating the current technology (e.g., model, component, etc.) in the device truth table and then examining the documentation of related technologies for the same device. The owner of each identified SPICE model having that component may be notified and given the option of making a similar change in their own model, or not making the change. In some embodiments, the notification may include a date by which a response (e.g., update or do not update) is needed. In step 320, a monitoring report may be generated to document the change (or changes) that have occurred. These changes may also be reflected in the technology definition table and/or the device truth table.

Figure 4:
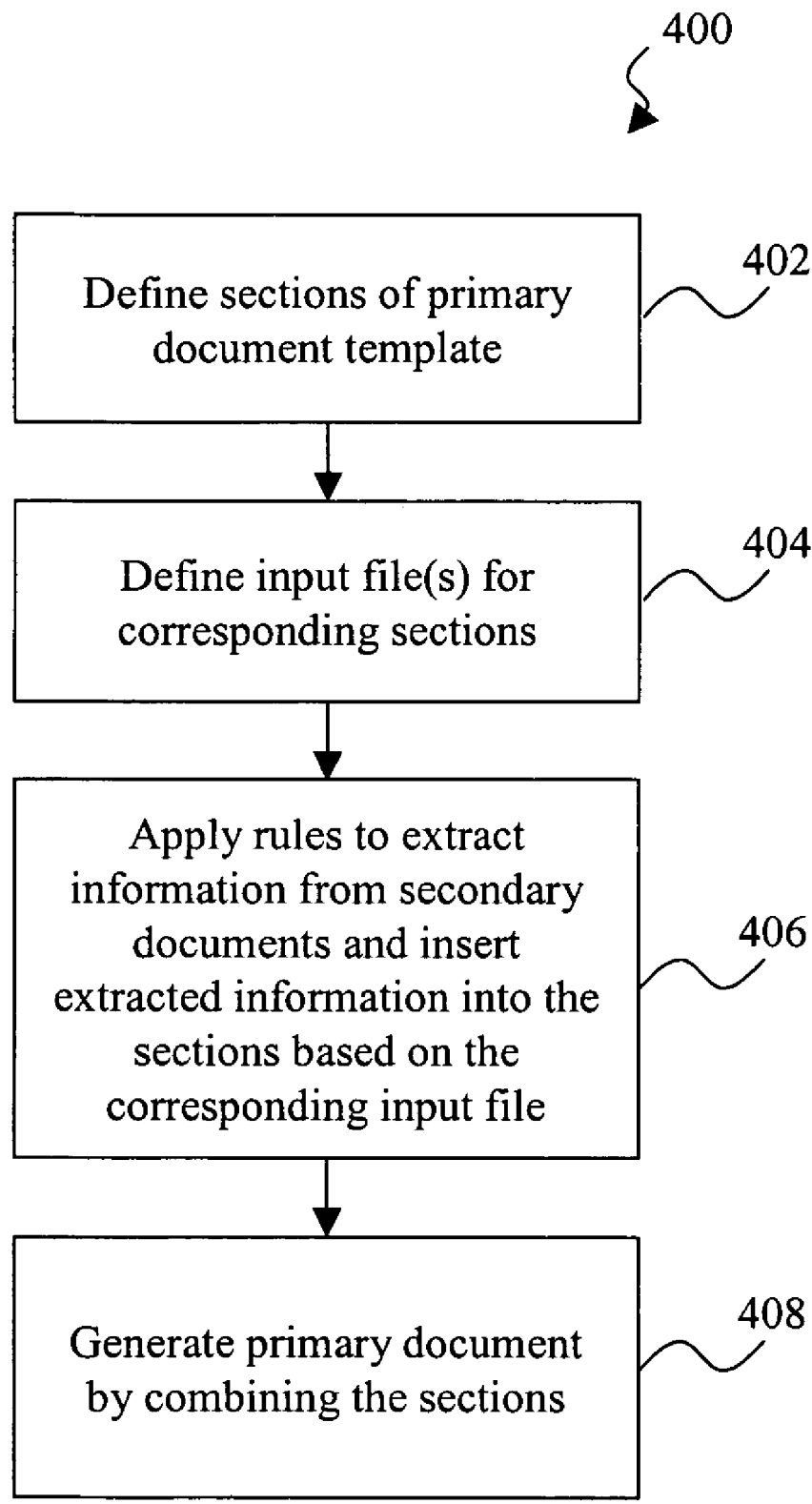
FIG. 4 is a flow chart of an exemplary method for creating the primary document.
Figure 5:
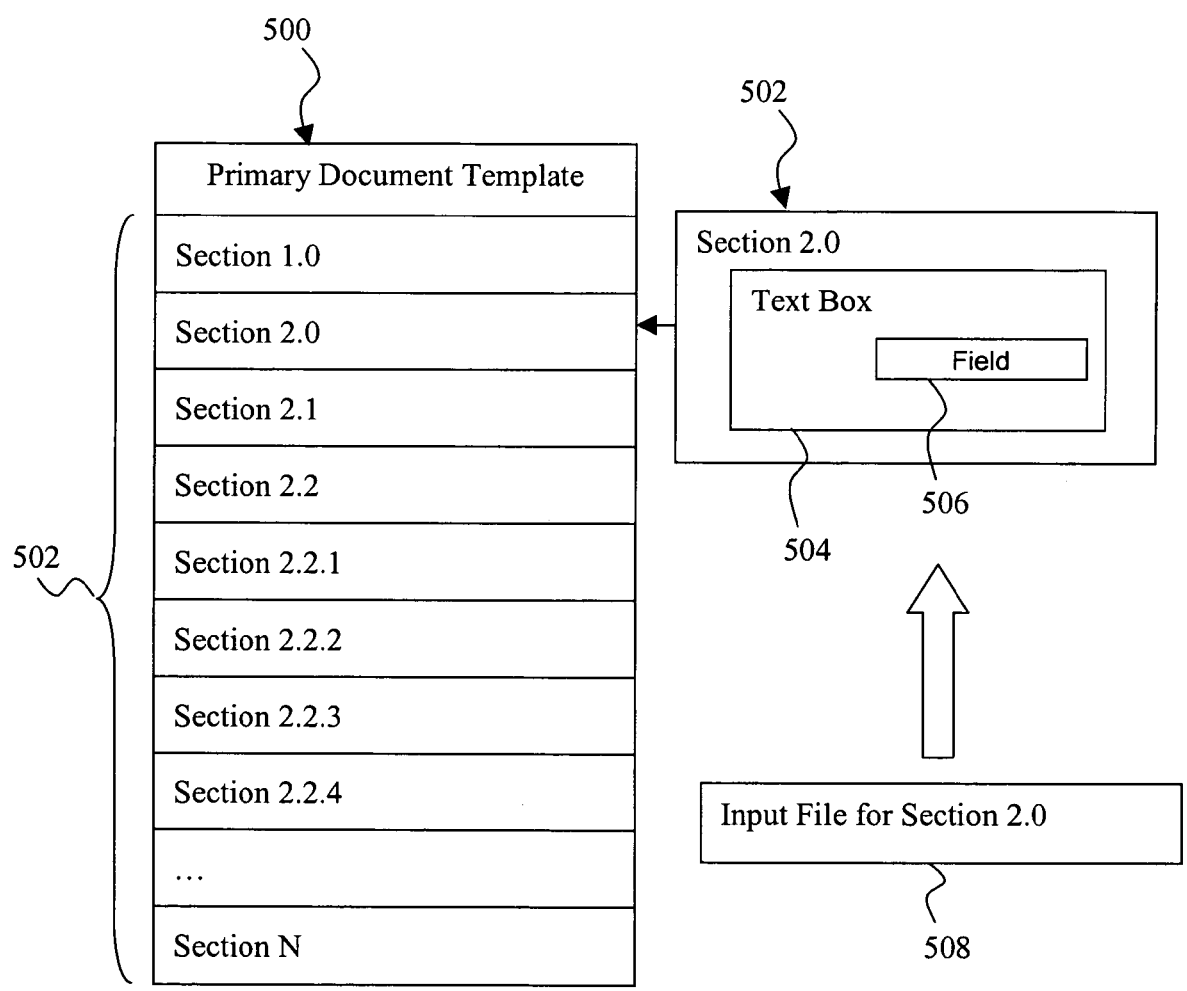
FIG. 5 illustrates an exemplary primary document template that may be used with the methods of FIGS. 2-4 to generate the primary document.
Figure 6:
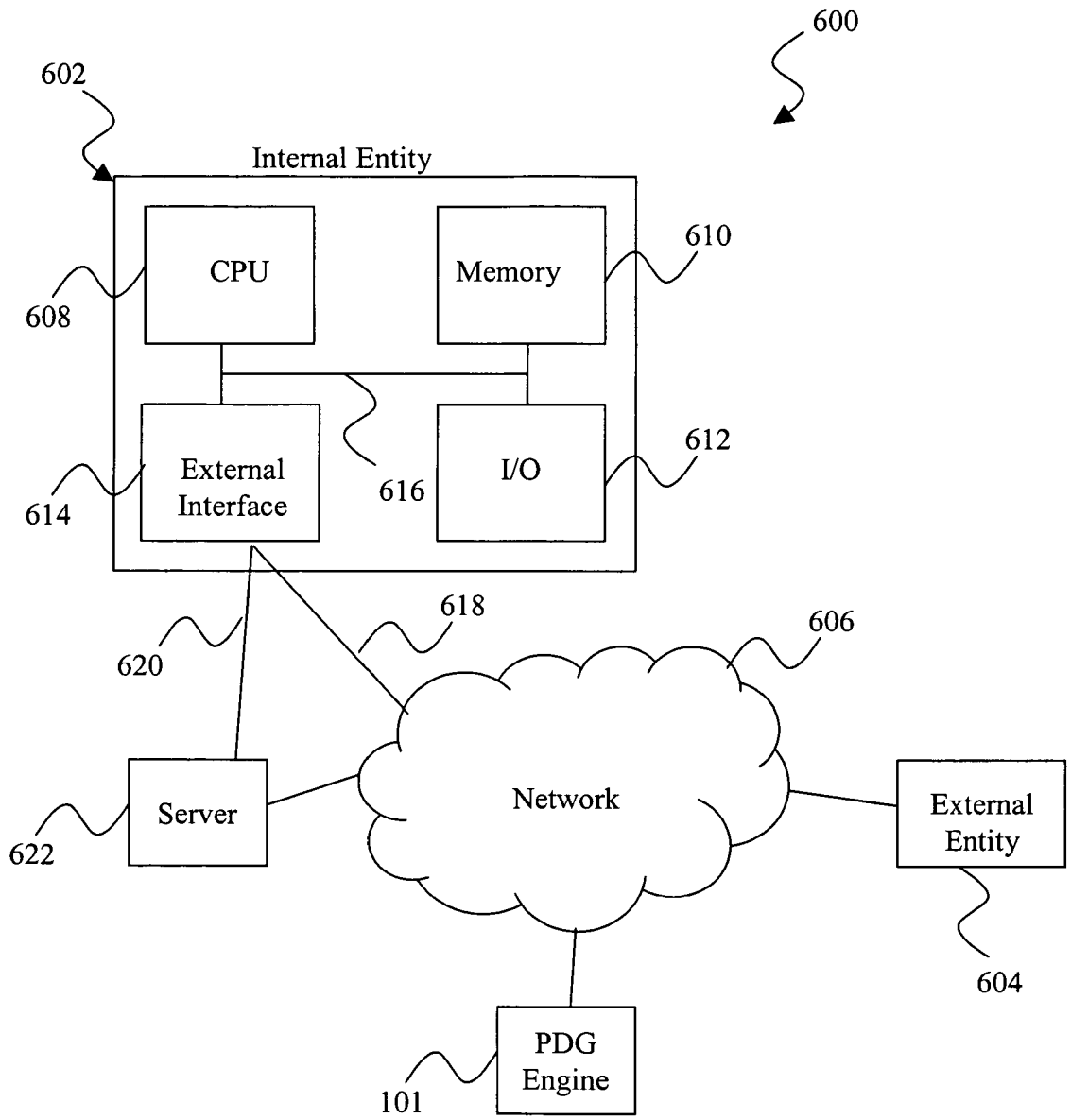
FIG. 6 illustrates a more detailed view of the exemplary semiconductor manufacturing system of FIG. 1.

Referring now to FIG. 4 and with additional reference to FIGS. 5 and 6, a method 400 provides one example of a method for generating a primary document using a primary document template and one or more input files. As previously described, a set of design rules and a device definition table may be in place to control the extraction of information from one or more secondary documents and the insertion of the extracted information into the primary document template based on the input files.

In step 402, multiple sections of a primary document template may be defined. In some embodiments, a generic template may be defined, and then additional primary document templates may be defined that further customize the generic template for specific technologies, manufacturing groups, customers, etc. Using the device definition table and the generic template, a primary document template may be created for a specific technology.

As is illustrated in FIG. 5, an exemplary primary document template 500, such as may be used to generate one of the primary documents 122 of FIG. 1, is illustrated. The primary document template 500 includes multiple sections 502 that are labeled "Section 1," "Section 2.0," "Section 2.1," "Section 2.2.0," etc. Each section 502 may form a template (as illustrated for Section 2.0) that includes one or more text boxes 504 containing one or more fields 506. As will be described in greater detail below, the information may be retrieved from the secondary documents 124-132 based on an input file 508 and inserted into the fields 506 of the Section 2.0 (and other sections, based on the corresponding input file for each section). Although not shown in detail, the input files may also contain text or other predetermined content within the text box 504 that is not altered when information is inserted into the field 506. One or more input files 508 may be associated with each section 502 (shown in the present example as being associated with Section 2.0), although not all sections may have a corresponding input file.

As illustrated below in Table 1, the primary document template 500 may be divided into the sections illustrated in FIG. 5, with each section being associated with a section name, description, device type (e.g., n-channel or p-channel), model or figure names, and other parameters (e.g., voltages and minimum/maximum line widths). Some of the entries may be created and/or filled manually (e.g., the descriptions), while others may be automatically inserted based on the device definition table (e.g., Min. Width and Min. Length).

TABLE 1

| Section | Description | Device | Model Naming | Vdd | Min. Width (N/P) | Min Length (N/P) |
|---|---|---|---|---|---|---|
| Section 2.2.1 | 1.0 V Standard Vt | N/P | nch, pch | 1.0 | 0.15/0.15 | 0.13/0.13 |
| Section 2.2.2 | 2.5 V Standard Vt | N/P | nch_25, pch_25 | 2.5 | 0.15/0.15 | 0.28/0.28 |
| Section 2.2.3 | 1.0 V Native | N | nch_na | 1.0 | 0.15 | 0.13 |
| Section 2.2.4 | 2.5 V Native | N | nch_na25 | 2.5 | 0.15 | 0.28 |

Referring again to FIG. 4, in step 404, one or more input files (e.g., the input file of 508 of FIG. 5) may be defined. The content of each section (or subsection) may be defined in an input file, as illustrated below in Table 2. For example, the input file for Section 2.2 may designate a source (e.g., system), type of information (e.g., text), and various other parameters that identify the content of the section. In the present example, the input files are formatted as spreadsheet files, but it is understood that they may be provided in other formats.

TABLE 2

(Input file for Section 2.2)

| Field Name | Source | Type | Entry |
|---|---|---|---|
| Section availability | system | text | 1 |
| Vt definition | system | text | maximum transconductance (Gm) approach |
| Vds for Vt def | system | text | 0.05 |

An input file may also be created to define the content for each subsection, as illustrated in Table 3 for Section 2.2.1. The input file for this section includes a variety of parameters that define a source (e.g., user, system, model card), type (e.g., text, table, figure), and entry (e.g., subject of text, keywords, figure names, etc.) of information for various portions of the section, as well as optional information. For example, in the row entitled "NMOS_binning", which identifies a figure as the type, the option may enable a user to define a location of the figure with respect to a page of the document.

TABLE 3

(Input file for Section 2.2.1)

| Field Name | Source | Type | Entry | option |
|---|---|---|---|---|
| Section_availability | user | text | 1 | |
| Section_title | system | text | 1.0 V Standard Vt | |
| NMOS_binning | user | figure | a program to generate the binning scheme | 900, 10, 1.2, 0.6, 0.15 |
| PMOS_binning | user | figure | a program to generate the binning scheme | 900, 10, 1.2, 0.6, 0.15 |
| Binning_caption | system | text | 1.0 V Standard Vt | |
| Key_param_table | model card | table | a program to run simulation and extract results | nch, pch |
| Key_param_table_caption | system | text | 1.0 V Standard Vt | |
| Skew_param_table | model card | table | a program to extract parameters | nch, pch |
| Skew_param_table_caption | system | text | 1.0 V Standard Vt | |
| OPC_offset | user | text | 15 | |
| OPC_accuracy_minL | user | text | 7 | |
| OPC_accuracy_maxL | user | text | 7 | |
| Fig_ring_cal_room_temp | user | figure | ring25_25.png | center/50% shrinkage |
| Fig_ring_cal_high_temp | user | figure | ring125_25.png | center/50% shrinkage |
| Fig_ring_cal_caption | system | text | 1.0 V Standard Vt | |
| Ring_NP_widths | system | text | 3.5 and 5 | |
| Inverter_simulation | model card | table | a program to run simulation and extract results | |
| NAND_simulation | model card | table | a program to run simulation and extract results | |
| NOR_simulation | model card | table | a program to run simulation and extract results | |
| Ring_table_caption | system | text | 1.0 V Standard Vt | |

In step 406, the previously defined rules may be applied (e.g., using the PDG engine 101 of FIG. 1) to extract information from secondary documents (such as a model card or a simulation) and insert the extracted information into the primary document template 500 based on the input files. For example, in the row of Table 3 entitled "Key_param_table", the source is a model card. As identified in the comments and options, a program may be executed using the SPICE models "nch" and "pch" (see also Table 1 for the column entitled "Model Naming"), and the results may be inserted into the primary document as a table (as defined in the "Type" column). In this manner, the primary document template may be filled using both predefined and dynamically generated information retrieved from the user, system, and/or model cards.

Referring now to FIG. 6, a virtual IC fabrication system (a "virtual fab") 600 provides a more detailed example of the exemplary semiconductor manufacturing system 100 and the PDG engine 101 of FIG. 1. The virtual fab 600 includes a plurality of entities represented by one or more internal entities 602 and one or more external entities 604 that are connected by a communications network 606. The network 606 may be a single network or may be a variety of different networks, such as an intranet and the Internet, and may include both wireline and wireless communication channels.

Each of the entities 602, 604 may include one or more computing devices such as personal computers, personal digital assistants, pagers, cellular telephones, and the like. For the sake of example, the internal entity 602 is expanded to show a central processing unit (CPU) 608, a memory unit 610, an input/output (I/O) device 612, and an external interface 614. The external interface may be, for example, a modem, a wireless transceiver, and/or one or more network interface cards (NICs). The components 608-614 are interconnected by a bus system 616. It is understood that the internal entity 602 may be differently configured and that each of the listed components may actually represent several different components. For example, the CPU 608 may actually represent a multi-processor or a distributed processing system; the memory unit 224 may include different levels of cache memory, main memory, hard disks, and remote storage locations; and the I/O device 612 may include monitors, keyboards, and the like.

The internal entity 602 may be connected to the communications network 606 through a wireless or wired link 618, and/or through an intermediate network 620, which may be further connected to the communications network. The intermediate network 620 may be, for example, a complete network or a subnet of a local area network, a company wide intranet, and/or the Internet. The internal entity 602 may be identified on one or both of the networks 606, 620 by an address or a combination of addresses, such as a MAC address associated with the network interface 614 and an IP address. Because the internal entity 202 may be connected to the intermediate network 620, certain components may, at times, be shared with other internal entities. Therefore, a wide range of flexibility is anticipated in the configuration of the internal entity 602. Furthermore, it is understood that, in some implementations, a server 622 may be provided to support multiple internal entities 602. In other implementations, a combination of one or more servers and computers may together represent a single entity.

In the present example, the internal entities 602 represents those entities that are directly responsible for producing the end product, such as a wafer or individually tested IC devices. Examples of internal entities 602 include an engineer, customer service personnel, an automated system process, a design or fabrication facility and fab-related facilities such as raw-materials, shipping, assembly or test. Examples of external entities 604 include a customer, a design provider, and other facilities that are not directly associated or under the control of the fab. In addition, additional fabs and/or virtual fabs can be included with the internal or external entities. Each entity may interact with other entities and may provide services to and/or receive services from the other entities.

It is understood that the entities 602, 604 may be concentrated at a single location or may be distributed, and that some entities may be incorporated into other entities. In addition, each entity 602, 604 may be associated with system identification information that allows access to information within the system to be controlled based upon authority levels associated with each entities identification information.

The virtual fab 600 enables interaction among the entities 602, 604 for purposes related to IC manufacturing, as well as the provision of services. In the present example, IC manufacturing can include one or more of the following steps:

receiving or modifying a customer's IC order of price, delivery, and/or quantity;

receiving or modifying an IC design;

receiving or modifying a process flow;

receiving or modifying a circuit design;

receiving or modifying a mask change;

receiving or modifying testing parameters;

receiving or modifying assembly parameters; and receiving or modifying shipping of the ICs.

One or more of the services provided by the virtual fab 600 may enable collaboration and information access in such areas as design, engineering, and logistics. For example, in the design area, the customer 604 may be given access to information and tools related to the design of their product via the fab 602. The tools may enable the customer 604 to perform yield enhancement analyses, view layout information, and obtain similar information. In the engineering area, the engineer 602 may collaborate with other engineers 602 using fabrication information regarding pilot yield runs, risk analysis, quality, and reliability. The logistics area may provide the customer 604 with fabrication status, testing results, order handling, and shipping dates. It is understood that these areas are exemplary, and that more or less information may be made available via the virtual fab 600 as desired.

Another service provided by the virtual fab 600 may integrate systems between facilities, such as between a facility 604 and the fab facility 602. Such integration enables facilities to coordinate their activities. For example, integrating the design facility 604 and the fab facility 602 may enable design information to be incorporated more efficiently into the fabrication process, and may enable data from the fabrication process to be returned to the design facility 604 for evaluation and incorporation into later versions of an IC.

The PDG engine 101 may retrieve information from documents or other information from sources within or associated with the internal entity 602, the external entity 604, and/or the server 622. This information may be used to generate a primary document as previously described, which may then be used to synchronize changes through the virtual fab 600. It is understood that the PDG engine 101 may include a combination of software and hardware, or may be software that is installed onto another entity (e.g., the internal entity 602).

Although embodiments of the present disclosure have been described in detail, those skilled in the art should understand that they may make various changes, substitutions and alterations herein without departing from the spirit and scope of the present disclosure. For example, various steps in the methods may be performed in a different order than that described, may be removed, or may be performed in parallel. Furthermore, additional steps may be added, and each step may be replaced by smaller or more detailed steps. In addition, multiple steps may be combined into a single step, and various functions may be combined or separated. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method for generating a primary document for a device in a semiconductor manufacturing environment, wherein the primary document is used to characterize the device, and wherein the primary document is generated using a computer associated with the semiconductor manufacturing environment, the method comprising:
   creating a design rule that defines a relationship between first and second technologies;
   creating a primary document template for a device in the first technology;
   creating at least one input file to associate information from a plurality of secondary documents with the primary document template;
   generating the primary document by retrieving information from the secondary documents and inserting the retrieved information into the primary document template based on the input file; and
   applying the design rule to identify a corresponding device in the second technology.

2. The method of claim 1 wherein defining the relationship between the first and second technologies includes creating a device truth table.

3. The method of claim 1 wherein retrieving information from the secondary documents includes retrieving information from a model card assigned to the device.

4. The method of claim 1 further comprising performing a simulation using a model of the device, wherein the simulation produces information for insertion into the primary document template.

5. The method of claim 1 further comprising sending a notification that the corresponding device in the second technology should be updated to reflect the primary document.

6. The method of claim 5 further comprising defining a period of time in which a response to the notification must be submitted.

7. The method of claim 6 wherein the response indicates that the update is performed or not performed.

8. The method of claim 1 further comprising providing an instruction set for parsing the input file and generating the primary document.

9. The method of claim 1 wherein creating the primary document template includes creating a plurality of sections and subsections, wherein at least some of the sections and subsections are associated with an input file.

10. A method for generating a primary document in a semiconductor fabrication environment using a plurality of secondary documents and at least one input file, the method comprising:
    defining at least a first device within a first technology area and a second device within a second technology area, wherein the first and second devices include at least one common element;
    updating information defining the common element with respect to the first device;
    generating a primary document for the first device based on the updated information;
    sending a notification that the common element has been updated with respect to the first device; and
    determining whether to update the common element with respect to the second device.

11. The method of claim 10 wherein generating the primary document includes:
    providing an instruction set forming rules for parsing a plurality of secondary documents associated with the first device;
    dividing a primary document template into a plurality of sections;
    creating an input file for at least some of the sections, wherein each input file defines information to be inserted into the corresponding section;
    applying the rules to extract information from the secondary documents, wherein the extraction includes parsing the information and inserting the parsed information into the corresponding section based on the input file; and
    combining the plurality of sections into the primary document based on the primary document template.

12. The method of claim 11 wherein each input file identifies which of the secondary documents to parse for the corresponding section.

13. The method of claim 11 wherein each section includes a text body and at least one field embedded in the text body, wherein information is inserted into the field.

14. The method of claim 10 further comprising generating a monitoring report based on the primary document to show whether the common element was updated with respect to the second device.

15. The method of claim 10 wherein updating information defining the common element with respect to the first device includes updating a model card assigned to a model representing the first device.

16. The method of claim 10 wherein updating information defining the common element with respect to the first device includes updating an import file assigned to a model representing the first device.

17. The method of claim 10 further comprising:
    identifying a model associated with the first device, and
    executing a simulation using the model to provide simulation results, wherein updating information defining the common element with respect to the first device uses the simulation results.

18. A system for combining a plurality of secondary documents into a primary document for use in a semiconductor manufacturing system, the system comprising:
    the plurality of secondary documents, wherein each secondary document is associated with a first or second technology;
    a device definition table describing a first semiconductor device formed in accordance with the first technology and a second semiconductor device formed in accordance with the second technology, wherein the first and second devices contain a common element;
    a primary document template for the first device and a plurality of input files corresponding to sections of the primary document template; and
    a primary document assembly engine for generating the primary document, the engine adapted to execute a plurality of instructions including:
       instructions for applying a predefined set of rules to parse information from the secondary documents based on the input files when the common element is updated with respect to the first device;
       instructions for inserting the parsed information into the corresponding sections based on the input files;
       instructions for combining the sections into the primary document based on the primary document template; and instructions for notifying a user responsible for the second device that the common element has been updated with respect to the first device.

19. The system of claim 18 further comprising:
a plurality of manufacturing entities containing the secondary documents; and
a network connecting the manufacturing entities with the primary document assembly engine.

20. The system of claim 18 further comprising instructions for automatically converting information from the secondary documents into a predefined format.

21. The system of claim 18 further comprising instructions for identifying a most recent version of each of the secondary documents and automatically parsing information from the most recent version.

22. The system of claim 18 further comprising:
instructions for executing a simulation using a model of the first device; and
instructions for including results from the simulation when generating the primary document.

* * * * *